Figure 1:
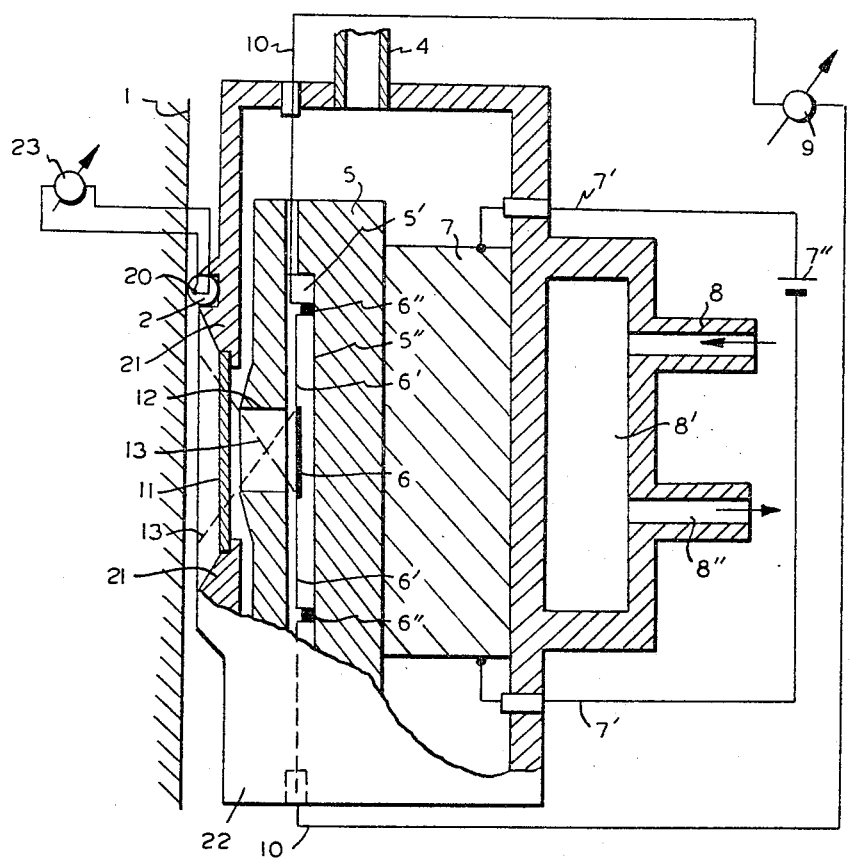

Oct. 11, 1966      G. F. VANDERSCHMIDT      3,277,715
METHOD OF AND APPARATUS FOR MEASURING THE
EMITTANCE OF A RADIATION-EMITTING SURFACE
Filed June 27, 1962

*INVENTOR*
GEORGE FREDERICK VANDERSCHMIDT

BY  *Rines and Rines*

ATTORNEYS

3,277,715
METHOD OF AND APPARATUS FOR MEASURING THE EMITTANCE OF A RADIATION-EMITTING SURFACE
George Frederick Vanderschmidt, Boston, Mass., assignor to Lion Research Corporation, Cambridge, Mass., a corporation of Massachusetts
Filed June 27, 1962, Ser. No. 205,741
11 Claims. (Cl. 73—355)

The present invention relates to methods of and apparatus for measuring the emittance of a radiation-emitting surface and, more particularly, though not substantially exclusively, to the measurement of the temperature or emissivity of a heat-radiating surface.

Numerous types of devices have been evolved throughout the years for measuring the temperature of a surface. It is often necessary, however, to determine the amount of radiation emitted into space by a surface as, for example, in the case of satellites in orbit. Two factors govern the emitted radiation; first, the actual temperature assumed by the surface; and, secondly, the emissivity or inverse of reflectivity of the surface. The so-called "emittance" of a radiating-emitting surface is a function of both the temperature and the emissivity, as described, for example, in the Encyclopedia of Physics, edited by Flugge and published by Springer Verlag, volume 9, pp. 129–133. The "emittance" is equal to the product of the emissivity constant, Boltzmann's constant, and the fourth power of the absolute temperature.

In certain prior-art emissometers, the color of the emitting body is visually matched to the color of a calibrated black-body source. This method requires a temperature of emission from the source which is much higher than many materials can achieve and produces an emissivity figure which is pertinent to the visible, rather than the infrared, light range. Emissivity measurements have also been made by means of spectrophotometer or reflectometer; but operating such apparatus in the range of the far infrared (beyond 10 microns) is difficult, complex, costly, and decidedly unsuitable for portable operations.

An object of the present invention, accordingly, is to provide a new and improved method of and apparatus for emittance measurements, including both emissivity and temperature, that shall not subject to the limitations and disadvantages of the prior-art structures above set forth, but that shall, to the contrary, provide a high degree of portability, simplicity, and low cost for the facile measurement of emissivity and/or temperature.

Another object is to provide a novel emissivity and/or temperature measuring apparatus of more general utility, as well.

Other and further objects will be explained hereinafter and will be more particularly pointed out in connection with the appended claims. In summary, however, from one of its broad aspects, the invention involves measuring the emittance of a radiation-emitting surface as to which one, but not both, of the emissivity and temperature is known, and the other is to be determined. The steps involved include spacing from a radiation-emitting surface a further surface of known emissivity, adjusting the temperature of the further surface to a predetermined value different from the said temperature of the radiation-emitting surface, interposing in the space between the radiation-emitting surface and the further surface a third surface of known emissivity, such that the temperature assumed by the third surface results from radiation in the said space substantially exclusively, and measuring the temperature of the third surface so interposed. Preferred constructional details are hereinafter set forth.

Figure 2:
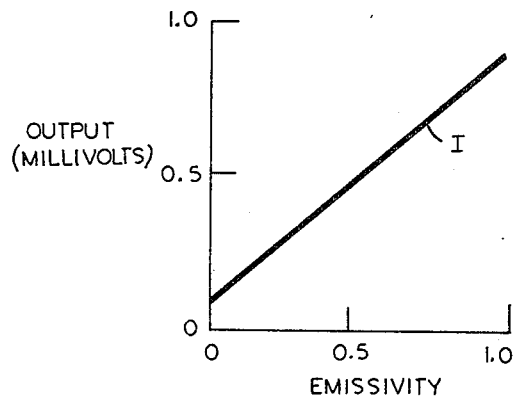

The invention will now be described in connection with the accompanying drawing, FIG. 1 of which is a longitudinal section of an apparatus constructed in accordance with a preferred embodiment of the invention; and FIG. 2 is a graph illustrating approximate measurements obtainable with the aid of the system of FIG. 1.

Referring to FIG. 1, the housing 22 of the emissometer, for purposes of illustration, is shown juxtaposed to a surface 1, the emissivity or temperature of which is to be determined under the respective conditions that either the temperature or emissivity is already known. The invention may, however, be used with remote surfaces, as well.

A further surface 5″, disposed within the housing 22, is spaced from the radiation-emitting surface 1, and is maintained, as later explained, at a temperature of value different from the temperature of the radiation-emitting surface 1. The further surface 5″ is shown in the form of the rear wall of a copper cavity-defining chamber 5. The front and side walls of the chambers are shown spaced from the corresponding walls of the housing 22, thereby providing substantial isolation from thermally conductive contact. Within the cavity or space 5′ defined by the chamber 5, between the further surface 5″ and the surface 1 that is emitting radiation, is interposed a radiation-responsive third surface 6, such as a thermopile receiver disc. A suitable thermopile detector 6 may be, for example, the type described in an article entitled, "Dependence on Atmospheric Pressure of the Response Characteristics of Thermopile Radiant Energy Detectors," by A. R. Karoli et al. appearing in the Journal of the Optical Society of America, vol. 50, No. 8, 758–763, August 1960. Other well-known radiant energy detecting surfaces may also be employed.

The surface 6 is suspended by very thin wires 6′, such as thermocouple wires, from electrically insulating posts 6″ secured to the upper and lower regions of the inner surface 5″ of the chamber 5. In effect, therefore, the third surface 6 is maintained relatively free-floating in the space between the radiating surface 1 and the chamber surface 5″ so that any temperature assumed thereby does not result from conduction from the surrounding structure, but results substantially exclusively, from radiation received in the space 5′. Further to this end, the housing 22 may be evacuated, as through the vacuum outlet 4, to prevent convection-current and other spurious temperature transfer to the surface 6 and to eliminate variation in response as the housing 22 is oriented in different directions or operated under other varying external conditions.

The emissivity of the surface 5″ may be predetermined. It may be established at a value of substantially unity by coating the same with Parsons optical black lacquer or the like (Thos. Parsons & Sons, Ltd., Mitcham, Surrey, England). Similarly, the emissivity of the opposite surfaces of the thermopile element 6 is predetermined, as by establishing an emissivity of substantially unity by carbon-black or particulate gold-black deposits thereon. Such deposits desirably add as little weight as possible to the thin floating detector 6.

In accordance with the illustrated preferred embodiment of the invention, the adjustment of the temperature of the surface 5" to a value different from that of the radiation-emitting surface 1 is effected by a thermoelectric element 7 in heat-transfer relation with the chamber 5 for heating or cooling the same. A suitable thermoelectric element 7 may, for example, be the type sold under the trademark "Frigistor" by General Thermoelectric Corporation of Princeton, New Jersey, or the Westinghouse Company thermoelectric cooler type WX814, or the like. The thermoelectric element 7 is connected by conductors 7' to its voltage supply, schematically illustrated by the battery 7". Water or other coolant may be introduced into a chamber 8', in contact with the thermoelectric element 7, through an inlet 8. The coolant may then be circulated out at 8".

With the surface 5" thus maintained at a known temperature different from, and preferably somewhat lower than, the temperature of the radiation-emitting surface 1, since the amount of radiation reflected by the surface 5" and by the detector 6 are known as a result of their predetermined emissivities, the temperature that the surface 6 assumes from radiation in the space between the surface 1 and the surface 5", will provide a measure of the emissivity (or temperature, if emissivity is known) of the radiation-emitting surface 1. This measurement may be effected by means of the output conductors 10 that connect the thermopile detector 6 to a suitable indicating circuit, such as a millivoltmeter 9.

In the apparatus of FIG. 1, a window 11 of infrared-transparent material, such as KRS5, crystalline sodium iodide or calcium bromide, seals a front opening in the housing 22. In the case of the application of the housing 22 directly to a surface 1, as illustrated, in order that the housing may always be positioned a constant distance from the surface 5", a guiding ring 2 of hard rubber or similar heat-isolating material is provided, protruding outward above shoulders 21 at the front of the housing 22. The walls of the housing, indeed, are preferably of material that is a poor heat conductor, such as stainless steel or the like.

Further in accordance with the invention, in order to insure that the thermopile surface 6 receives only radiation directly from the surface 1, an aperture 12 in the front or left-hand) wall of the chamber 5 is dimensioned such that the field optically intercepted by the detecting surface 6, as represented by the intersecting dotted lines 13, is free of any other surface or element of the system. The walls bounding the aperture or opening 12 may be either painted black to provide a stable substantially unity emissivity, as described previously, or may be silvered or otherwise rendered highly reflective to provide a stable surface that, in such case, improves transmission of radiation from the surface 1. Other wall coatings of predetermined stable emissivity or reflectivity may also be used. The outer exposed surfaces or shoulders 21 of the housing near the window 11, are preferably also of stable emissivity or reflectivity in order to insure constant conditions of measurement; and to this end, a silvered surfacing is desirable.

As an example of the performance of an instrument constructed and operated as in the embodiment of FIG. 1, reference is made to the graph of FIG. 2, in which the output of the thermopile detector 6, as indicated by the millivoltmeter 9, is plotted along the ordinate, and the emissivity constant of the surface 1 is plotted along the abscissa. The surface 1 was at a temperature of 27° C. and the surface 5" was cooled to −10° C. For this experiment, the distance from the surface 1 to the surface 6 was about 7/16 of an inch, and the distance from the detector 6 to the surface 5" was about 1/16 of an inch, with the housing 22 evacuated to about 10 microns of mercury. A substantially linear relationship I was found to exist between the output, as measured on the millivoltmeter 9, and the emissivity of the surface 1, with about one-half a millivolt output representing an emissivity of about 0.5.

As before stated, where the emissivity of the surface 1 is known, the readings of the meter 9 may then be equated to the actual temperature of the surface 1. In order to keep the apparatus in calibration, and in order to know the approximate temperature of the surface 1, moreover, a small thermocouple or other temperature-measuring device 20 may be provided at the front of the housing 22, connected with a suitable indicator, such as a meter 23. By adjustment of the end point of the curve I of FIG. 2, as by adjustment of the millivoltmeter 9 with a high reflecting standard surface 1 in position, and adjustment of the slope of the curve I, as by adjustment of the millivoltmeter 9 to read full scale with a highly absorbent standard surface 1, the emissivity of a sample surface-to-be-tested at the same temperature (as determined by the element 20) may be measured without further calibration.

Further modifications will suggest themselves to those skilled in the art, and all such are considered to fall within the spirit and scope of this invention, as defined in the following claims.

What is claimed is:

1. Apparatus for measuring emittance comprising, in combination, a housing having a rear wall, side walls, and a front wall provided with a radiation-permeable opening, a chamber in said housing having a rear wall, side walls, and a front wall provided with a radiation-permeable aperture aligned with said opening, said rear wall of said chamber having a surface of known emissivity behind said aperture, means for controlling the temperature of said surface, said chamber being mounted in said housing with its front and side walls substantially isolated from thermally conductive contact with the corresponding walls of said housing and with its rear wall in heat transfer relation with said temperature controlling means, a temperature-responsive surface of known emissivity mounted within said chamber in the space between said aperture and the first-mentioned surface and substantially isolated from thermally conductive contact with the walls of said chamber, and means for measuring the temperature assumed by said temperature-responsive surface.

2. The apparatus of claim 1, wherein the front and side walls of said chamber are separated from the corresponding walls of said housing by an evacuated space and said housing has poor heat conductivity.

3. The apparatus of claim 1, wherein said temperature-responsive surface is part of a heat-to-electric energy transducer having faces of known emissivity, said temperature measuring means comprising means for measuring the electric energy transduced from the temperature assumed by said transducer.

4. The apparatus of claim 3, wherein said transducer is a thermopile suspended upon fine wires.

5. Th apparatus of claim 1, wherein said first-mentioned surface is black in order to provide an emissivity of substantially unity.

6. The apparatus of claim 1, wherein said temperature-responsive surface is black in order to provide an emissivity of substantially unity.

7. The apparatus of claim 1, wherein said temperature-controlling means comprises thermoelectric means supporting said chamber upon the rear wall of said housing.

8. The apparatus of claim 7, wherein said thermoelectric means is mounted in heat transfer relation with a cooling member and comprises means for cooling said surface below the temperature of a radiation-emitting surface-to-be-measured.

9. The apparatus of claim 1, wherein said front wall of said housing has means for positioning said opening near a radiation-emitting surface-to-be-measured.

10. The apparatus of claim 1, further comprising auxiliary temperature-measuring means for determining the approximate temperature at a radiation-emitting surface-to-be-measured.

11. The apparatus of claim 1, wherein the walls of said opening are of predetermined stable emissivity.

References Cited by the Examiner

UNITED STATES PATENTS

| | | | |
|---|---|---|---|
| 2,366,285 | 1/1945 | Percy et al. | 73—355 |
| 2,811,856 | 11/1957 | Harrison | 73—355 |
| 2,912,862 | 11/1959 | Machler et al. | 73—355 |
| 2,959,925 | 6/1959 | Franiti et al. | 136—4.2 |
| 3,062,893 | 12/1962 | Kerstetter | 73—355 |

OTHER REFERENCES

Harrison, Jr.: Radiation Pyrometry and Its Underlying Principles of Radiant Heat Transfer, N.Y., Wiley & Sons, Inc., 1960, pp. 68–78, QC 338 H3 C2.

Hessey, R. E.: New Radiation Pyrometer For Low Temperatures. In Instrumentation 3(5), pages 23–26, Fourth Quarter, 1948.

LOUIS R. PRINCE, *Primary Examiner.*

ISAAC LISANN, *Examiner.*

S. H. BAZERMAN, *Assistant Examiner.*